United States Patent [19]

Albright

[11] 4,219,059

[45] Aug. 26, 1980

[54] APPARATUS FOR HARVESTING AND BUNCHING TREES

[76] Inventor: Alva Z. Albright, 6407 Masonic Dr., Alexandria, La. 71301

[21] Appl. No.: 911,587

[22] Filed: May 31, 1978

[51] Int. Cl.³ ............................................. A01G 23/08
[52] U.S. Cl. ................................. 144/34 R; 30/379.5; 30/381; 144/3 D
[58] Field of Search ............... 144/2 Z, 3 D, 34 R, 144/34 E, 309 AC; 83/928; 30/382, 383, 381, 379.5

[56] References Cited

U.S. PATENT DOCUMENTS

| | | | |
|---|---|---|---|
| 3,042,088 | 7/1962 | Filon et al. | 30/383 |
| 3,140,736 | 7/1964 | Propst | 144/34 R X |
| 3,604,479 | 9/1971 | Jordan | 144/34 R |
| 3,726,326 | 4/1973 | Coleman | 144/34 R |
| 3,848,648 | 11/1974 | Dika et al. | 144/34 E |
| 3,991,799 | 11/1976 | Albright | 144/309 AC |

FOREIGN PATENT DOCUMENTS

| | | | |
|---|---|---|---|
| 255534 | 11/1963 | Australia | 30/381 |
| 702507 | 2/1941 | Fed. Rep. of Germany | 144/34 R |
| 468614 | 4/1975 | U.S.S.R. | 144/34 R |

Primary Examiner—W. Donald Bray
Attorney, Agent, or Firm—James B. Lake, Jr.

[57] ABSTRACT

An improved tree harvester and buncher of the horizontally articulated type with stump gripper, as described in my U.S. Pat. Nos. 3,991,799 and 3,946,775, and 4,013,106, wherein the tree cutting device is lowered to reduce stumpage waste and the actuating motor thereof is raised to prevent trash interference therewith. Also a tree chock is independently pivoted to follow the tree cutting device into a tree cut as the cut is opened by horizontal articulation of the harvester and buncher to chock a tree against vertical slippage in tree supporting grapples and the stump gripper on the stump for preventing the cutting device from binding in the cut or being bent therein. Also a stump penetrating member is mounted below the tree cutting device for penetrating the stump, and in cooperation with the stump gripper, assist in preventing movement of the harvester and buncher relative to the stump. And also a power and control system that coordinates the opening of lower tree supporting grapples and the swinging of pivotally mounted upper tree supporting grapples upward and rearward to release a cut tree, when horizontal, to fall on roll bars and drop to the sides and clear of forward movement of the tree harvester and buncher which remains gripping the stump for permitting the harvesting of trees beyond the size that could normally be harvested.

1 Claim, 5 Drawing Figures

APPARATUS FOR HARVESTING AND BUNCHING TREES

BACKGROUND OF THE INVENTION

The invention relates generally to harvesting and bunching trees, and more particularly to improved apparatus and methods for more efficiently harvesting and bunching trees in a wider range of sizes with no diminution in safety.

It is old in the prior art as shown by prior U.S. Pat. Nos. 3,991,799, 3,946,775, and 4,013,106 issued to me to fell trees in a biased direction using an articulated type harvester and buncher with stump gripper.

SUMMARY OF THE INVENTION

An object of the invention is to provide a tree harvester and buncher that is not limited by its mass to the size of trees that can be harvested and side bunched.

Another object of the invention is to positively chock a tree through cutting to prevent all slippage of the trunk downward relative to the harvester and buncher and all slippage thereof relative to the stump gripper.

Another object of the invention is to provide a power and control system for coordinating cutting and bunching operations for maximum efficiency and safety.

DETAILED DESCRIPTION OF THE INVENTION

Figure 1:
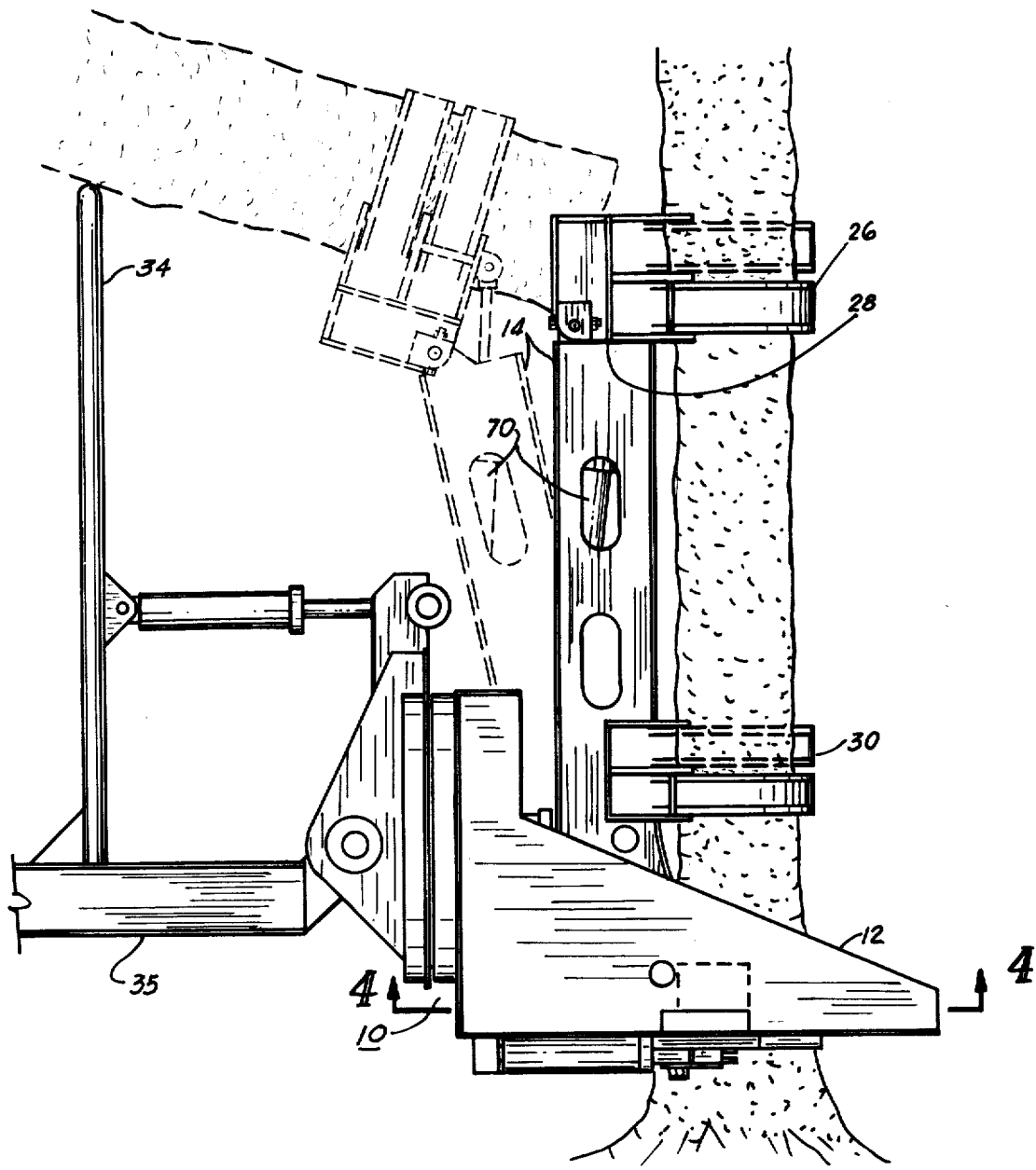
FIG. 1 is a side elevation of the invention in two operating conditions.

Referring to FIGS. 1-5, the invention comprises an improved tree harvester and buncher 10 of the horizontally articulated type having a base structure 12 pivotally supporting an upper structure 14 for limited swinging rearward from vertical. Based structure 12 has been improved by raising a chain saw motor 16 above ground trash level without raising an associated chain saw 18, providing an independently pivoted and movable tree chock 20 adapted to follow chain saw 18 into its cut as the cut is opened by the rearward swinging of upper structure 14, an by a stump penetrating device 22 mounted in alignment with a stump gripper 24 for providing therewith triangular gripping engagement of a stump until cutting and bunching is completed. Upper structure 14 has been improved by mounting an upper set of tree grapples 26 on the upper end 28 thereof for pivoting upward and to the rear approximately 90 degrees, and by coordinating the pivoting with opening a lower set of tree grapples 30 by means of an hydraulic power and control system 32. Roll bars 34 have been added over the top of a comventional power train 35, partially indicated, which is the source of auxiliary hydraulic power for the system 32.

Figure 3:
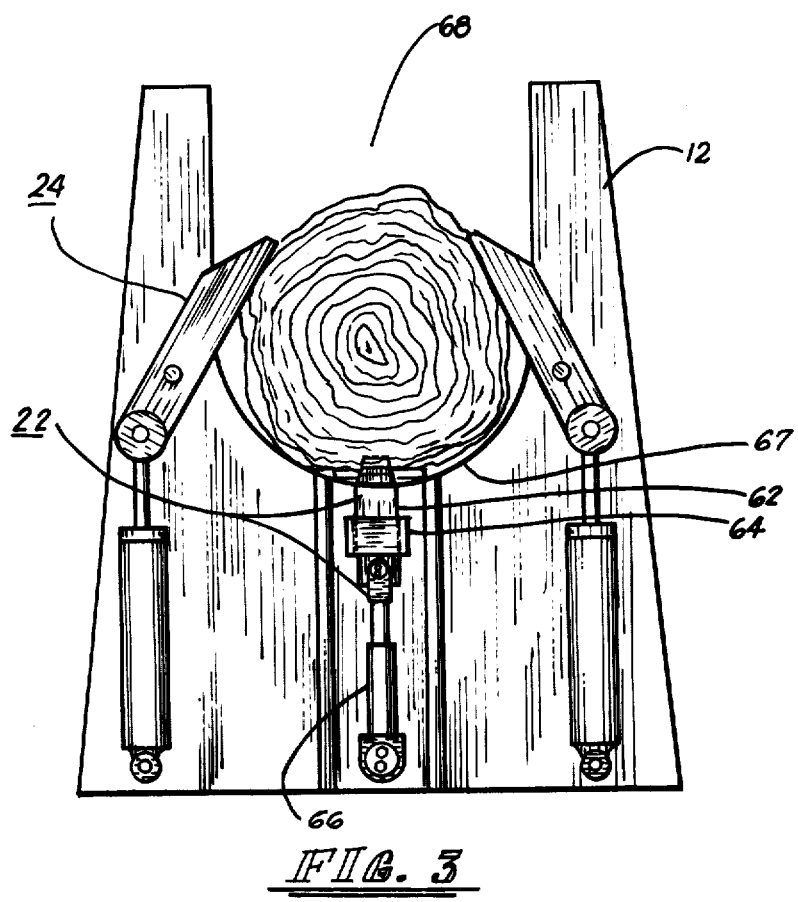
FIG. 3 is a bottom view of the invention showing additional stump engaging appartus.
Figure 4:
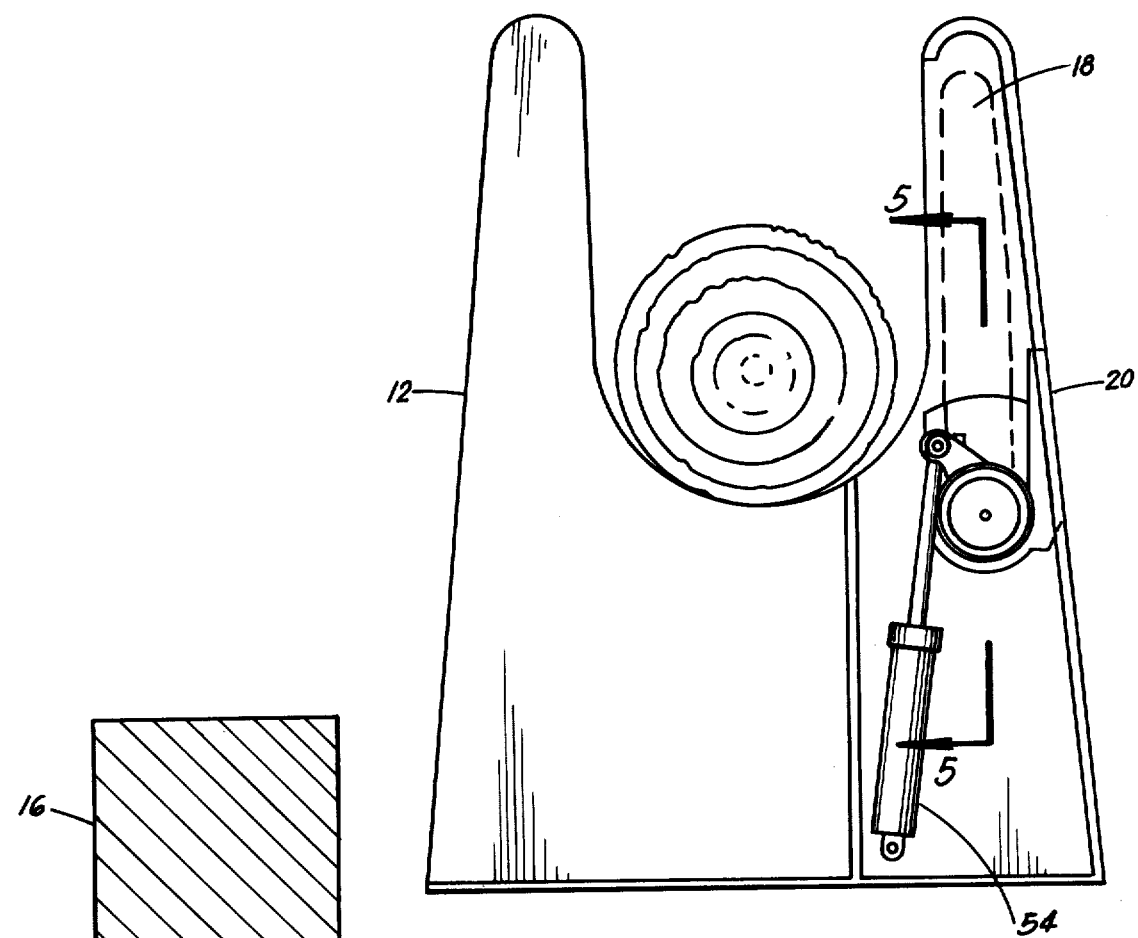
FIG. 4 is a cross-sectional view along section lines 4—4 of FIG. 1.
Figure 5:
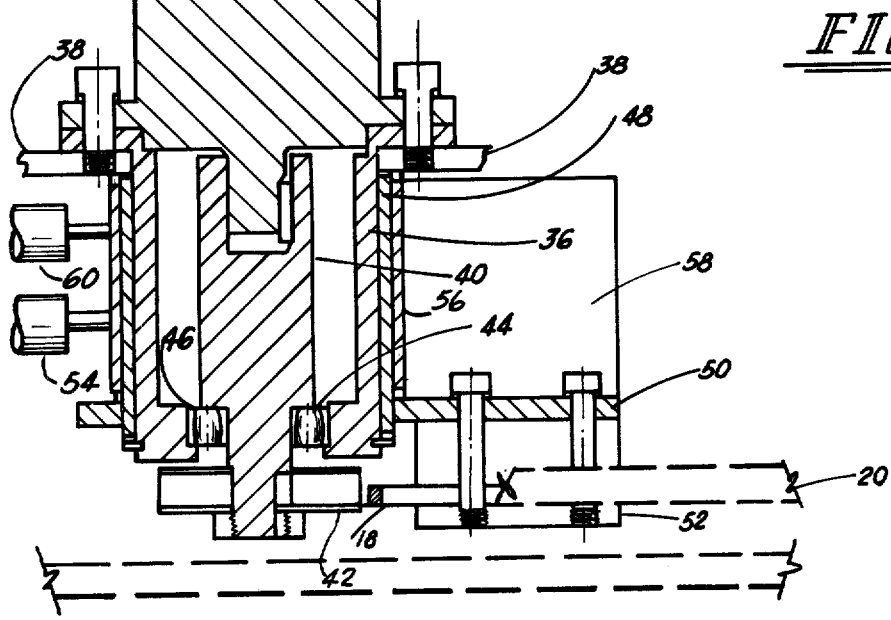
FIG. 5 is a cross-sectional view along section lines 5—5 of FIG. 4.

Referring to FIGS. 1, 3, and 5, of base structure 12 improvements, saw chain motor 16 is mounted on a tube 36 suspended from interior flanges 38 of said base structure. An elongated drive shaft 40 is concentrically mounted in tube 36 and keyed at its upper end to motor 16 and to a sprocket 42 at its lower lower end for driving chain saw 18 around its saw bar, with thrust bearings 44 mounted in the lower end of tube 36 engaging under flange 46 of drive shaft 40. A first outer concentric sleeve 48 is mounted for turning around tube 36 and is bolted through flange 50 to chain saw support 52 and to an actuating hydraulic cylinder 54 adapted to swing said chain saw in cutting operation. A second concentric sleeve 56 is mounted for turning around the first concentric sleeve 48 and is welded to a flange 58 carrying tree chock 20 connected to an actuating hydraulic cylinder 60 for swinging said tree chock into a cut made by said chain saw as the horizontally articulated upper structure 14 is biased rearward to open said cut.

Referring to FIG. 3, stump penetrating device 22 comprises a bar 62, having oppositely disposed ends and slidable in a sleeve 64, one of said oppositely disposed ends being sharpened and the other engageable by a piston end of hydraulic cylinder 66. The device 22 is mounted on the fore and aft centerline of the base structure 12, with sleeve 64 being bolted to the bottom of the base structure as the cylinder end of hydraulic cylinder 66, and with the sharp end of said bar 62 being forward and projectible beyond perimeter 67 of a tree-receiving cavity 68 defined forwardly by base structure 12. When the sharp end is so projecting it penetrates the stump part of an engaged tree and together with a stump gripper 24 triangularly engages the stump part to prevent any turning and tilting of the base structure 12.

Figure 2:
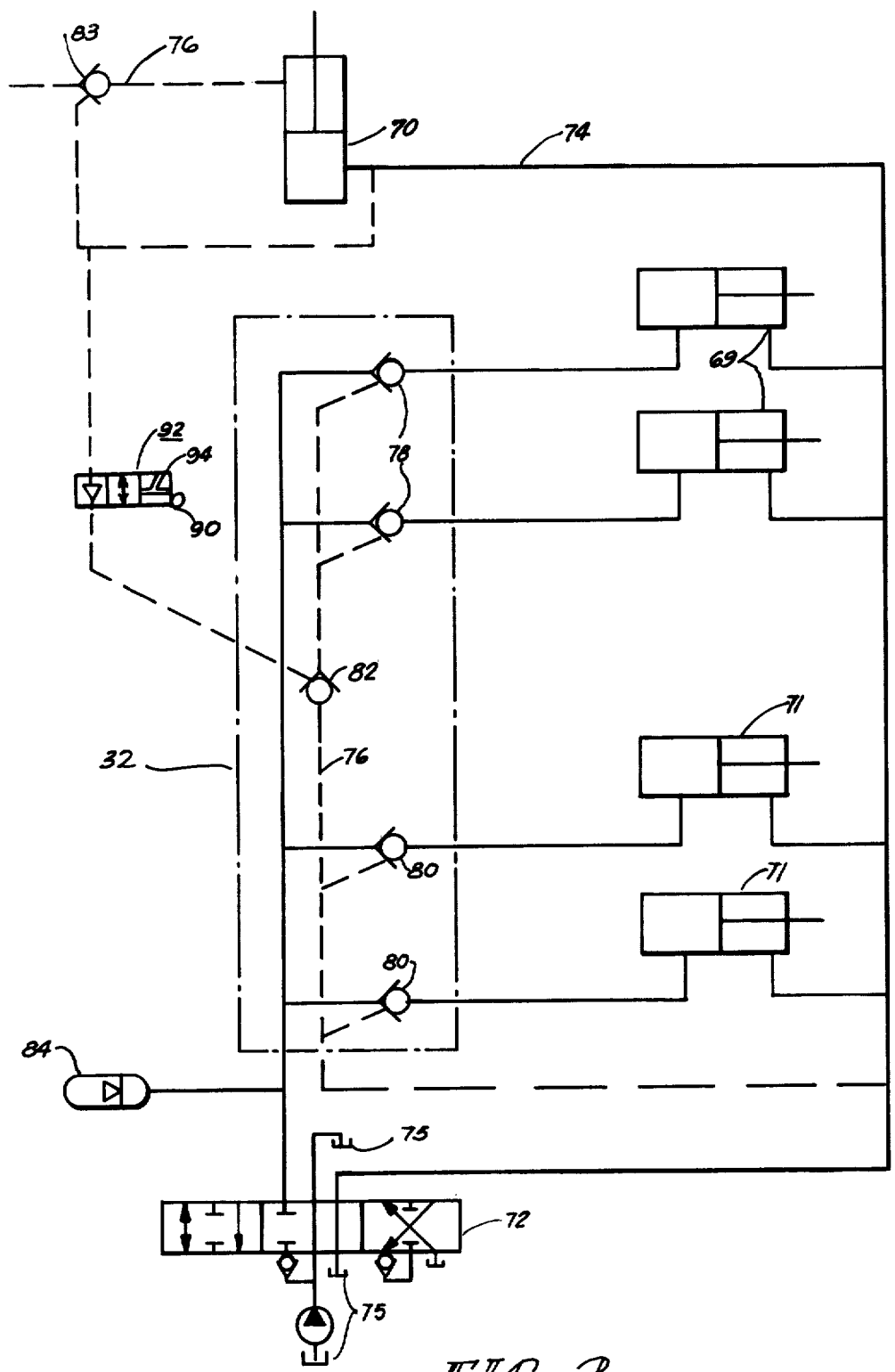
FIG. 2 is an hydraulic diagram of the power and control system for coordinating tree grapple operation.

Referring to FIGS. 1 and 2, upper grapple 26 is pivoted to open and close by hydraulic clinder 69 to release or grip a tree engaged in cavity 68, and is also pivoted to the top of upper structure 14 to swing a gripped tree rearward to an approximately horizontal position. The rearward pivoting is actuated by hydraulic cylinder 70, mounted in said upper structure 14, when tree cutting is completed, and at which time lower grapple 30 is pivoted to open by cylinders 71 to release the butt of the upright cut tree and leave it free to swing upward as upper grapple 69 pivots rearward. When the cut tree reaches an approximately horizontal position, cylinders 69 are actuated to open upper graple 26 and release the tree which drops on roll bars 34, mounted over the power train 35, and then to the ground on one side or the other of the harvester and buncher and out of the way of forward movement thereof.

Referring now to FIG. 2, power and control system 32 for controlling tree grapples 26 and 30 comprises a fourway, three-position hydraulic valve 72 connected as shown in FIG. 2 with main pressure lines shown in full lines and pilot operated check lines of less pressure shown in broken lines. When valve 72 is shifted to the right for gripping a tree, hydraulic main pressure is applied to the base ends of cylinders 69 and 71, and into accumulator 84. Rod ends of cylinders 69 and 71 are connected with the reservoir or tank and also the base end of cylinder 70. Valve 72 returns to center position and the liquid medium of main hydraulic pressure is trapped by pilot operated check valves 78 and 80 and also blocked in valve 72 for maintaining grapple pressure grip on said tree. However pressure can be maintained by flow of the medium from the accumulator 84. Should any shift of the tree allow the grapples to slacken, flow from the accumulator 84 to cylinders 69 and 71 will instantaneously tighten the grapples. When valve 72 is shifted to the left for releasing a tree, the base ends of cylinders 69 and 71 and the accumulator 84 are connected to tank or reservoir. Pressure to the rod ends of cylinders 69 and 71 releases pilot operated check valves 80 and opens bottom grapples, the upper grapples remaining closed because of closed check valves 78. This pressure is also applied to the base of cylinder 70 and pilot operated check valve 83 to overcome the pilot pressure in the rod end of cylinder 70 to tilt it up and to the rear with the tree. When the upper grapple has tilted the gripped tree to approximately horizontal, it contacts a cam 90 on a two way valve 92 causing it to shift to the left allowing the pilot pressure flow to pilot operated check 82 which then opens connecting the base ends of cylinders 69 to tank to open upper grapples and release the approximately horizontal tree.

Two way valve 92 has a second actuator 94 that allows an operator to open the upper grapples without the necessity of tilting them back to actuate cam 90, thereby permitting him to tilt the tree forward and release it if he should so desire.

What is claimed is:

1. In an apparatus for harvesting and bunching trees for use with a power train protected by roll bars mounted thereon and extending thereabove, said apparatus being of the vertically oriented horizontally articulated type, with chain saw and stump gripper means mounted in a base structure which is pivotally connected to an upper structure, said upper structure having tree grapples mounted thereon, power means operatively connected between said base and upper structure for causing relative pivoting therebetween, the improvement comprising:

(a) a stump penetrating device slidably mounted on the bottom of said base structure below said saw chain means, and means for actuating said stump penetrating device, said stump penetrating device and said stump gripper means defining means triangularly engaging a stump portion of a tree to rigidly anchor said apparatus during harvesting of a tree;

(b) chocking means pivotally mounted concentric with the chain saw in said base structure for independently following said chain saw into a cut as said cut is opened by relative pivoting of said base and said upper structure, said chocking means defining means for supporting an engaged tree from slipping in said grappels during cutting of the tree by said chain saw means;

(c) said tree grapples defining upper grapple means hinged to the top of said upper structure for swinging a cut tree from vertical to horizontal over the power train, and for releasing said cut tree to fall on said roll bars and to the ground.

* * * * *